United States Patent
Hulcher

(10) Patent No.: US 6,407,324 B1
(45) Date of Patent: Jun. 18, 2002

(54) PIANO INSTRUCTIONAL APPARATUS

(76) Inventor: Robert P. Hulcher, 416 Dauphin Island Pkwy., Mobile, AL (US) 36606

( * ) Notice: Subject to any disclaimer, the term of this patent is extended or adjusted under 35 U.S.C. 154(b) by 0 days.

(21) Appl. No.: 09/734,322

(22) Filed: Dec. 1, 2000

Related U.S. Application Data
(60) Provisional application No. 60/168,533, filed on Dec. 2, 1999.

(51) Int. Cl.[7] .............................................. G09B 15/08
(52) U.S. Cl. ...................................... 84/478; 84/479 R
(58) Field of Search ........................... 84/464 A, 464 R, 84/470 R, 477 R, 478

(56) References Cited

U.S. PATENT DOCUMENTS

| | | | |
|---|---|---|---|
| 529,928 A | 11/1894 | Lyle | 84/481 |
| 3,377,716 A | 4/1968 | Schmoyer | 84/478 |
| 3,379,087 A | 4/1968 | Weitzner | 84/478 |
| 3,482,480 A | 12/1969 | Decker | 84/478 |
| 3,693,493 A | 9/1972 | Schmoyer | 84/479 |
| 4,254,686 A | 3/1981 | Leonard | 84/481 |
| 4,516,465 A | 5/1985 | Kani | 84/478 |
| 5,107,743 A | 4/1992 | Decker | 84/478 |
| 5,394,784 A * | 3/1995 | Pierce et al. | 84/464 A |
| 5,557,055 A * | 9/1996 | Breitweiser, Jr. | 84/478 |
| 6,037,534 A * | 3/2000 | Yasutoshi et al. | 84/477 R |

* cited by examiner

*Primary Examiner*—Jeffrey Donels
(74) *Attorney, Agent, or Firm*—Garvey, Smith, Nehrbass & Doody, L.L.C.; Gregory C. Smith

(57) ABSTRACT

What is provided is a piano instructional apparatus including a frame positionable on the keyboard of a piano, the frame transversely slidable along the keyboard for going from key of C to other keys; two rows having a plurality of LEDs, positioned along the frame, over each note, so as to provide red LEDs on the lower row to strike the key with the left hand and green LEDs on the upper row to strike the key with the right hand, when a particular LED is lit. There is further provided a hand select means which allows a person to use a single hand during practicing certain notes. There is further provided encryption of certain tunes within the unit so that a person may call up a certain tune and follow the notes through the lighting of the LEDs, at either an automatic mode of their own selected tempo or a note by note advance using the provided foot switch. There may be included a metronome for following the beats in the tune selected.

11 Claims, 3 Drawing Sheets

FIG. 4
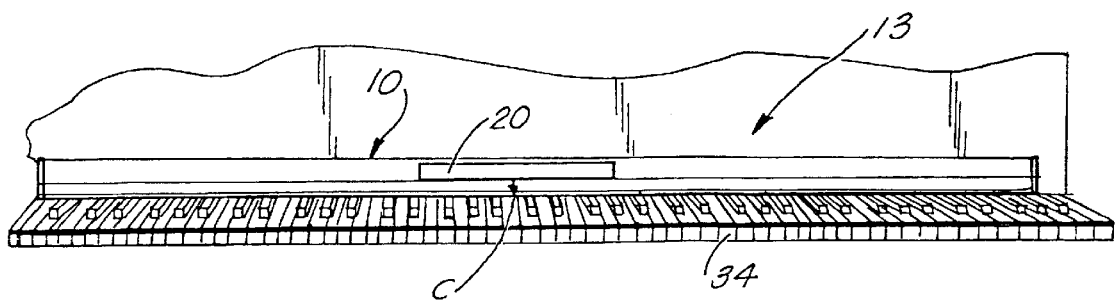
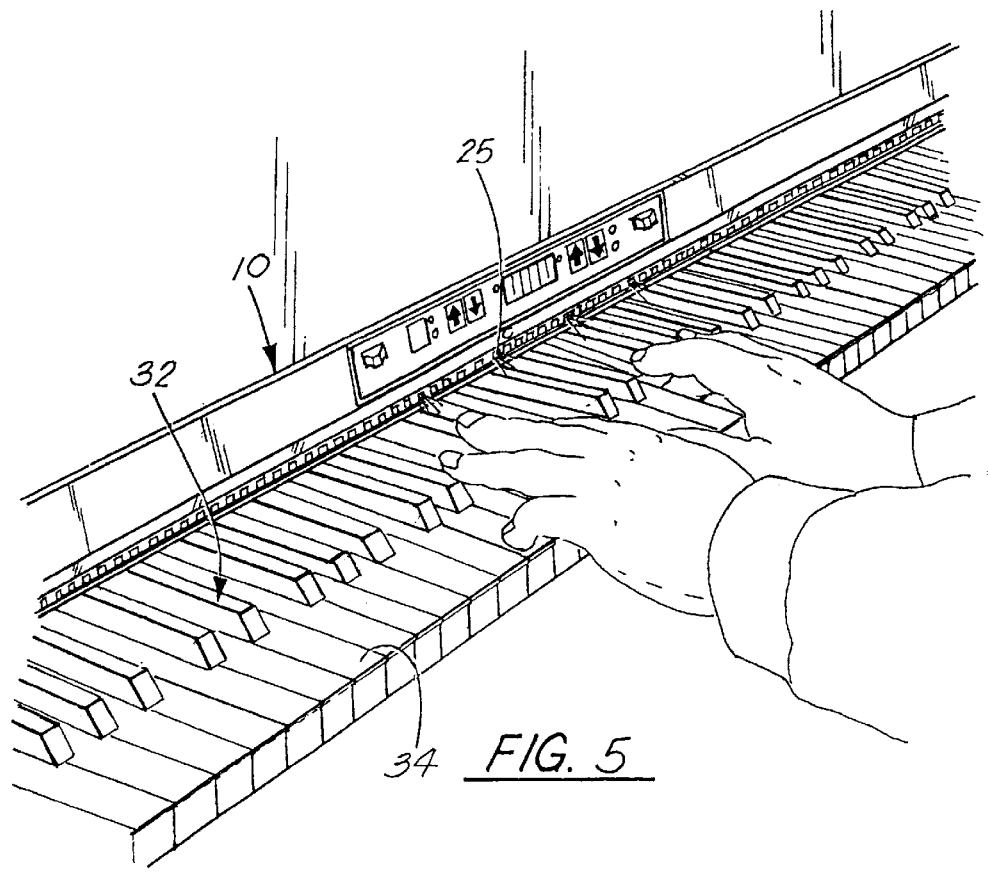
FIG. 5

PIANO INSTRUCTIONAL APPARATUS

CROSS-REFERENCE TO RELATED APPLICATIONS

Priority of U.S. Provisional Patent Application Serial No. 60/168,533, filed Dec. 2, 1999, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to piano instructional devices. More particularly the present invention relates to an improved device which is positionable on a piano keyboard, and through the use of preprogrammed red and green LED's, a person can play songs on the piano.

2. General Background of the Invention

In the subject of music instruction, one of the most valuable instruments taught is the piano. Instruction of how to play the piano has always utilized a one-on-one teacher to student participation over a very long time period. Although this system is continually to be utilized, there have been efforts to devise teaching methods wherein the student, playing alone, can learn how to play the piano to a certain extent. One of such methods is found in U.S. Pat. No. 5,107,743, issued to Decker, which teaches the use of a device which is placed upon a keyboard of a piano, the device maintained at a stationary location, so as to allow a student to follow its instructions. The device provides at least one light means which is capable of displaying multiple lights over a single key, such as green and red, alternatively, depending on the hand to be used. The device has certain drawbacks in that the device fits in place, and is prevented from moving laterally because of the raised black keys. Also, among other drawbacks, there is no left or right hand select, to allow the player to concentrate only on a single hand during practice.

Therefore, there is a need in the industry for an improved device which has additional features and which is novel in its approach to teaching people to play the piano without the need of a teacher.

BRIEF SUMMARY OF THE INVENTION

The apparatus of the present invention solves the problems in the art in a simple and straightforward manner. What is provided is a piano instructional apparatus including a frame positionable on the keyboard of a piano, the frame transversely slidable along the keyboard for going from key of "C" to other keys; two rows of light means, having a plurality of LEDs, positioned along the frame, over each note, so as to provide red LEDs on the lower row to strike the key with the left hand, and green LEDs on the upper row to strike the key with the right hand, when a particular LED is lit. There is further provided a hand select means which allows a person to use a single hand during practicing certain notes. There is further provided encryption of certain tunes within the unit so that a person may call up a certain tune and follow the notes through the lighting of the LEDs, at either an automatic tempo or their own selected tempo. There will be included a metronome for following the beats in the tune selected.

Therefore, it is the principal object of the present invention to provide an improved piano instructional apparatus which is positionable on the keyboard in such a manner so as to allow the unit to move transversely so that different keys may be selected by the user;

It is a further object of the present invention to provide a piano instructional device which uses two sets of LEDs of two different colors to allow left or right hand striking of the notes, depending on the color LED which is lit;

It is a further object of the present invention to provide an improved piano instructional unit which enables the user to select the tempo of the music, whether to utilize a built-in metronome, and whether the person selects only to play with a single hand rather than both hands during practice;

It is a further object of the present invention to provide an improved piano instructional device which has been pre-programmed to allow the user to visually follow the notes to be played by the color of a certain LED as notes in a selected tune are played, and the tempo at which to play the notes as they appear through the lighted LEDs.

BRIEF DESCRIPTION OF THE DRAWINGS

For a further understanding of the nature, objects, and advantages of the present invention, reference should be made to the following detailed description, read in conjunction with the following drawings, wherein like reference numerals denote like elements and wherein:

FIG. 4 illustrates an overall view of the apparatus positioned upon the keyboard of a piano; and FIG. 5 illustrates a close up view of the apparatus positioned upon the keyboard, illustrating in isolated view the readout board and LED configuration.

DETAILED DESCRIPTION OF THE INVENTION

Figure 1:
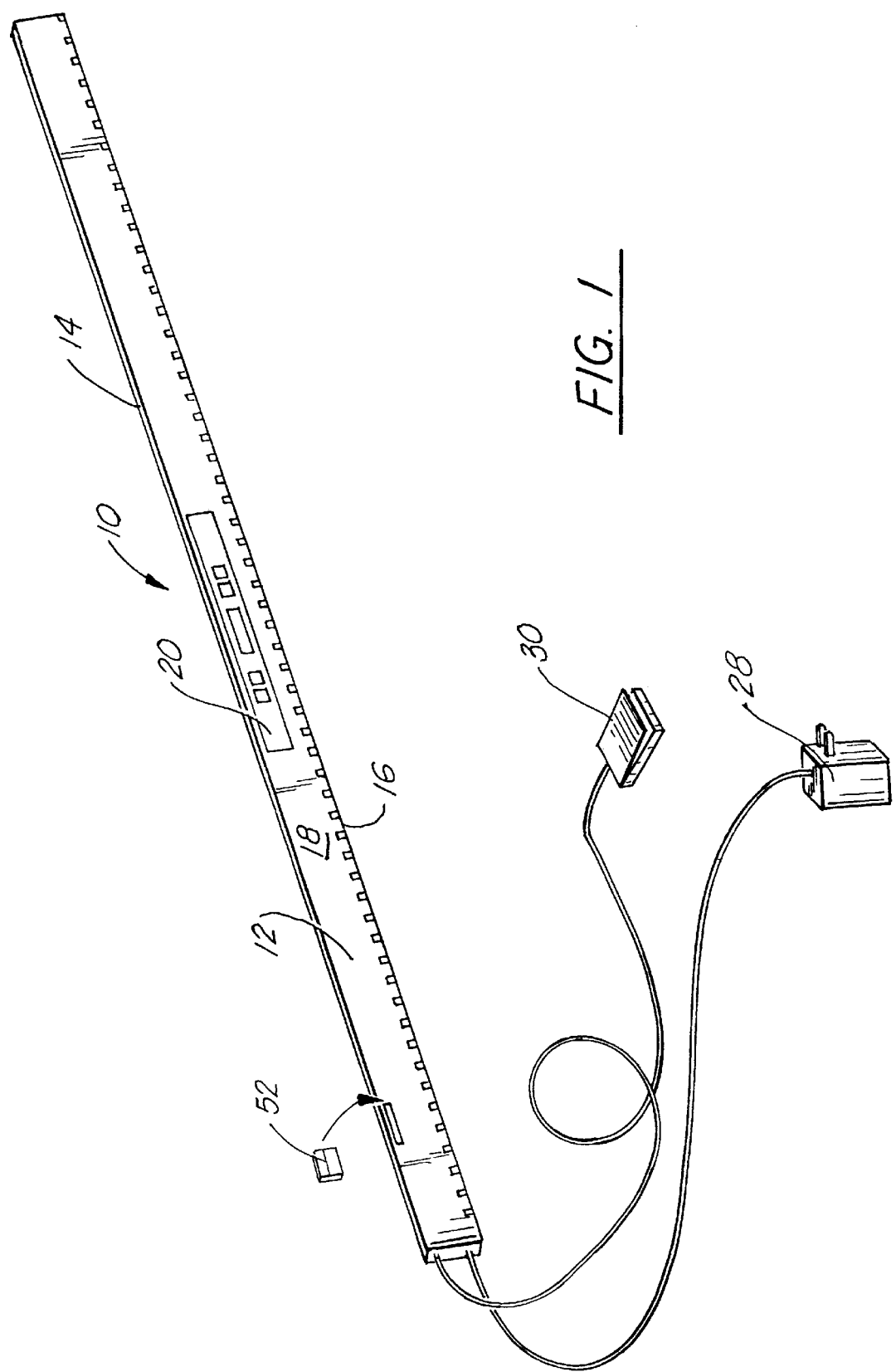
FIG. 1 represents an overall view of the preferred embodiment of the apparatus of the present invention.
Figure 2:
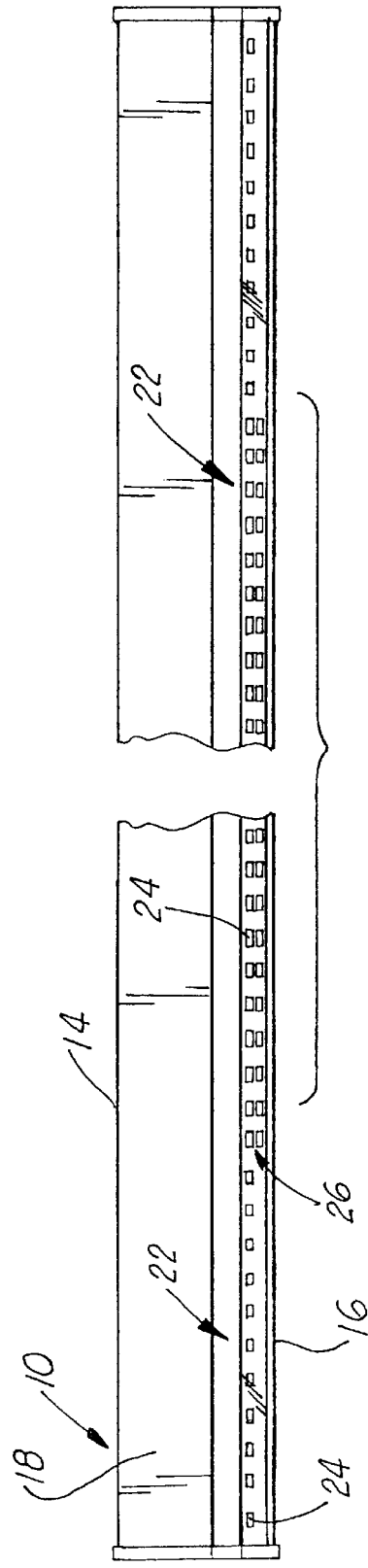
FIG. 2 illustrates an isolated view of the LED configuration on the face of the apparatus of the present invention.

FIGS. 1 through 5 represent the preferred embodiment of the improved piano instructional apparatus by the numeral 10. As illustrated, for example, in FIG. 1, apparatus 10 comprises an elongated frame 12, having sufficient length to be positioned upon the keyboard of a standard piano 13.(See FIG. 4). The frame 12 includes a top edge 14, a bottom edge 16, for resting on the piano keys, and a front face 18, having the readout board 20, as will be discussed further. There is also illustrated a plurality of LEDs 22 positioned along the front face 18 of frame 12, and as seen in FIG. 2, these LEDs 22 appear in a first upper row 24, and a second lower row 26, as will be discussed further. Returning to FIG. 1, the apparatus 10 also includes a power transformer 28 for plugging into conventional AC receptacle for powering the apparatus, and a foot switch 30 for starting the apparatus when in auto or advancing note by note to displayed color when in the manual mode.

Again, making reference to FIG. 2, there is seen in partial view the face 18 of apparatus 10 with the two rows 24, 26 of LEDs 22. For purposes of use, when the apparatus is placed on the piano keyboard 32 (FIG. 5), each LED 32 in lower row 26 is positioned over a piano key 34, with a particular LED 22 marked with a "C" 25 which represents that LED must be placed over middle C of the piano keyboard 32, if the song is to be played in key of "C". Transposition can be accomplished simply by placing LED 22 marked "C" over a different key such as "D", "E" or "F". However, it should be noted that the LEDs in the lower row 26 light up in the color RED when that note is to be played by the left hand, and the LEDs 22 in the upper row 24 light up GREEN when that note is to be played by the right hand. Therefore, when a tune, which has been encrypted into the computer chip in the apparatus is selected, the notes to be played will be lit up either RED or GREEN depending on the hand to play that note at that time.

Figure 3:
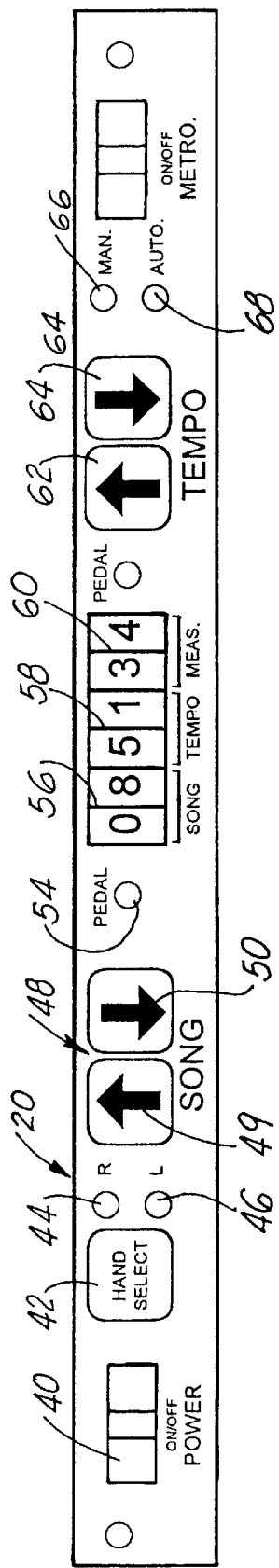
FIG. 3 illustrates an isolated view of the readout board positioned on the face of the apparatus of the present invention.

The ability of the apparatus to perform in the manner that it is able is controlled by the computer memory within the apparatus 10. When supplied with electrical power, the readout board 20 will be utilized to control and monitor the functions of the unit 10. As seen in FIG. 3, readout board 20, which is positioned at the center of the front face 18 of apparatus 10 provides an On/Off power switch 40, for powering up the unit; there is provided a hand select switch 42, which includes a Right indicator 44, and a left indicator 46, so that when the switch 42 is pressed, and the right indicator 44 lights up, then the unit will play the notes to be played by the right hand, and no left hand notes will light up. The reverse is true when the Left indicator 46 is activated. Further, readout board includes song selector switch 48, having arrows 49, 50, so that depending on the arrow pressed, the next song or previous song will be played by the unit. It is foreseen that the unit may have encrypted within the basic memory a total of 25 songs, but would have the ability to receive additional songs by simply inserting a cartridge 52 into the unit 10, as is illustrated in FIG. 1. The auto/manual function is achieved by reducing the tempo to display "00" in the box provided. "01" it will go to auto. The pedal light 54 is controlled by the encryption i.e. when the music indicates a depressed piano sustained pedal, both pedal lights will light up. This is used in auto only. There is then provided a series of three readouts, the first being number 56, which indicates the number of the song being played, the second 58 indicated at what tempo the song is being played, and the third 60, indicating at what measure; for example, in FIG. 3, the song being played is at measure 34. Next, the two arrows, 62, 64, provide that depending on which is pressed, the tempo may be increased, arrow 62, or decreased, arrow 64. There is provided two lights 66, 68 which depending on which is lit indicates whether the unit is being operated manually or automatically. And finally there is provided the metro switch 70 which when activated provides the metronome feature for counting out the beats as the song is played.

As seen in overall view in FIG. 4, the apparatus 10 is positioned on the piano keyboard 34, and simply rests upon the black keys. Because of this feature, if one chooses to play a song off of the normal key, when the C is positioned over the C note, one may simply slide the apparatus either left or right, which would allow the C to be placed over any other note, i.e., "D", "E", "F", "G", for playing the song in a different key. Thus, easily accomplishing transposition, otherwise a most difficult maneuver for a pianist.

In FIG. 5, there is illustrated a person 65 positioned at the keyboard 34, with the apparatus 10 placed over middle "C". The person, at this point, will have selected a song, and, as the song is played, each note is lit up as a particular red or green LED 22, and the person strikes that key, either with his left or right hand, depending on the color LED lit up. The person would follow the technique throughout the entire song. As was stated earlier, when reference was made to readout board 20 in FIG. 3, the person may select various options, such as playing with a single hand, through hand select 42, selecting a certain song, changing the tempo, activating the metronome, or even manually moving device 10 along the keyboard to play songs in different keys. Additionally, the device includes a song book whereby the person playing the song may follow the music in the book, and identify the measure at which the song is being played, by observing the readout in window 60, FIG. 3.

Through this technique, with this device, a person could become quite proficient in playing the piano in a short amount of time, and could become knowledgeable of many songs which could be encrypted into the device.

The foregoing embodiments are presented by way of example only; the scope of the present invention is to be limited only by the following claims.

What is claimed is:

1. An improved piano instructional apparatus, comprising:

a. a frame positionable on an upper surface the keyboard of a piano;

b. a first lower row of red LEDs on the face of the frame;

c. a second upper row of green LEDs on the face of the frame; each of the LEDs in the first and second rows positioned over a piano key;

d. means for activating a particular LED in a particular row when that note should be played either by the left or by the right hand of the player; and e. means for allowing the apparatus to be positioned on notes other than middle C by moving the apparatus along an upper surface of the keyboard.

2. The apparatus in claim 1, further comprising means for encrypting a plurality of songs in a memory of the apparatus.

3. The apparatus in claim 1, further comprising means to select either left or right hand LEDs to be lighted during the playing of a song.

4. The apparatus in claim 1, further comprising means for selecting the tempo and measure of the song being played.

5. The apparatus in claim 1, further comprising means to allow the apparatus to play songs at the automatically programmed tempo, or to select a manual tempo.

6. An improved piano instructional apparatus, comprising:

a. a frame slidably positionable on an upper surface of the keyboard of a piano;

b. a first lower row of red LEDs on the face of the frame;

c. a second upper row of green LEDs on the face of the frame; each of the LEDs in the first and second rows positioned over a piano key;

d. means for activating a particular LED in a particular row when that note should be played by either the left or right hand of the player, with the red LED indicating playing with the left hand, and green LED indicating a note to be played with the right hand; and e. means to allow the apparatus to play songs at the automatically programmed tempo, or to select a manual tempo.

7. The apparatus in claim 6, further comprising means for encrypting a plurality of songs in a memory of the apparatus.

8. The apparatus in claim 6, further comprising means to select either left or right hand LEDs to be lighted during the playing of a song.

9. The apparatus in claim 6, further comprising means for selecting the tempo and measure of the song being played.

10. The apparatus in claim 6, further comprising means to allow the apparatus to play songs at the automatically programmed tempo, or to select a manual tempo.

11. An improved piano instructional apparatus, comprising:
   a. a frame positionable on an upper surface of the keyboard of a piano, so that the apparatus may be positioned on notes other than middle "C" by sliding the apparatus along the upper surface of the keyboard;
   b. a first lower row of red LEDs on the face of the frame;
   c. a second upper row of green LEDs on the face of the frame; each of the LEDs in the first and second rows positioned over a piano key;
   d. means for activating a particular LED in a particular row when that note should be played either by the left or by the right hand of the player.

* * * * *